(12) United States Patent
Kegel

(10) Patent No.: US 10,291,692 B2
(45) Date of Patent: May 14, 2019

(54) SYSTEMS AND METHODS FOR TRUSTED CLUSTER ATTESTATION

(71) Applicant: Advanced Micro Devices, Inc., Sunnyvale, CA (US)

(72) Inventor: Andrew G. Kegel, Redmond, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 168 days.

(21) Appl. No.: 15/298,049

(22) Filed: Oct. 19, 2016

(65) Prior Publication Data

US 2018/0109561 A1 Apr. 19, 2018

(51) Int. Cl.
| | |
|---|---|
| *H04L 29/06* | (2006.01) |
| *H04L 29/08* | (2006.01) |
| *H04L 9/32* | (2006.01) |
| *G06F 21/57* | (2013.01) |

(52) U.S. Cl.
CPC ............. *H04L 67/10* (2013.01); *G06F 21/57* (2013.01); *G06F 21/575* (2013.01); *H04L 9/3234* (2013.01); *H04L 2209/127* (2013.01)

(58) Field of Classification Search
CPC ... G06F 21/57; G06F 21/577; H04L 2209/127
See application file for complete search history.

(56) References Cited

U.S. PATENT DOCUMENTS

| | | | |
|---|---|---|---|
| 9,122,875 B2 | 9/2015 | Bade et al. | |
| 2010/0235912 A1* | 9/2010 | Hermann | G06F 21/57 726/23 |

* cited by examiner

*Primary Examiner* — Dao Q Ho
(74) *Attorney, Agent, or Firm* — Meyertons Hood Kivlin Kowert and Goetzel PC; Rory D. Rankin

(57) ABSTRACT

Systems, apparatuses, and methods for implementing trusted cluster attestation techniques are disclosed. A cluster includes multiple computing devices connected together and at least one cluster security module. The cluster security module collects measurement logs and attestations from N computing devices, with N being a positive integer greater than one. The cluster security module also maintains a log and calculates an attestation for its own hardware and/or software. The cluster security module combines the logs from the N computing device and the log of the cluster security module into an aggregate log, with N+1 logs combined into the aggregate log. Then, the cluster security module generates a single attestation for the cluster to represent the cluster as a whole. The cluster security module is configured to provide the single attestation and aggregate log to an external device responsive to receiving a challenge request from the external device.

14 Claims, 6 Drawing Sheets

SYSTEMS AND METHODS FOR TRUSTED CLUSTER ATTESTATION

BACKGROUND

Description of the Related Art

A trusted computing environment typically includes a trusted platform with a tamper resistant processor. The trusted platform measures the state of the software and hardware of the computing environment and then cryptographically sign the measured state. This allows a third party to verify that a computer has a specified hardware setup and is using specified software. However, in some modern software applications, computations are too large to run on a single machine and instead require the use of a cluster of machines. A typical cluster or cloud system in use today includes large numbers of computers or servers connected together. Additionally, some applications are designed to run in front-end-back-end modes or in multilayer modes. Accordingly, it is complicated for a third party to verify the configuration of an entire cluster or cloud system with large numbers of computing devices.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
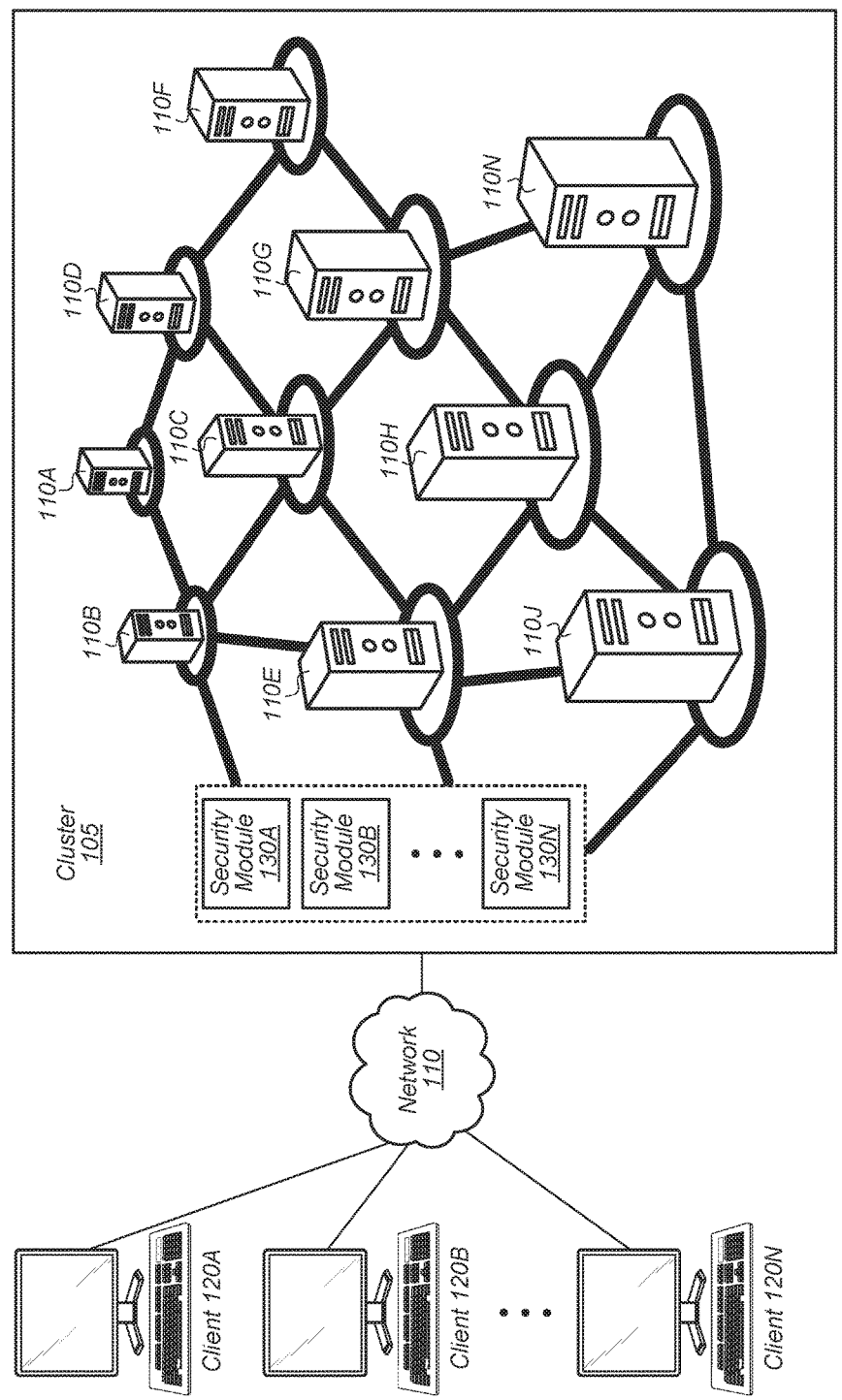
FIG. 1 is a block diagram of one embodiment of a computer system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing trusted cluster attestation techniques are disclosed herein. In one embodiment, a system with multiple computing devices includes one or more cluster security modules. The multiple computing devices can be considered a computing cluster in some embodiments. The multiple computing devices can be connected together using any of various interconnect and/or network technologies. Each of the one or more cluster security modules are configured to combine multiple measurement logs into an aggregate log and generate an attestation for the system as a whole. A cluster security module provides the attestation and aggregate log to a third party device in response to receiving a challenge request from the third party device.

In one embodiment, each computing device of the system is configured to maintain a log of measurements of hardware and/or software of the computing device and calculate an attestation from the log. In one embodiment, each computing device includes a local security module for maintaining the log of measurements and calculating the attestation. In one embodiment, the local security module is a trusted platform module (TPM). A cluster security module is configured to collect logs and attestations from N computing devices, wherein N is a positive integer greater than one. In one embodiment, the cluster security module is configured to collect logs and attestations from all computing devices of the cluster. In another embodiment, the cluster security module is configured to collect logs and attestations from a subset of the entirety of the computing devices of the cluster. The cluster security module also generates a log and an attestation for its own hardware and/or software.

In one embodiment, for one or more of the N computing devices, the cluster security module is configured to verify the attestation generated by the computing device by recomputing the attestation from the computing device's log. In some embodiments, the cluster security module is configured to verify attestations for all N computing devices by recomputing the attestations from the corresponding logs. If any of the attestations are invalid, then the cluster security module generates a warning for an administrator. If all of the attestations are valid, then the cluster security module vouches that the devices of the cluster are running trusted software. Additionally, if the attestations are valid, the cluster security module combines the logs from the N computing devices and the log of the cluster security module into an aggregate log, wherein N+1 logs are combined into the aggregate log. Also, the cluster security module generates a single attestation for the N computing devices and the cluster security module.

When the cluster security module receives a challenge request from an external device, the cluster security module sends the single attestation and the aggregate log to the external device. In one embodiment, the external device verifies the attestation for the cluster by recomputing the attestation from the aggregate log. In another embodiment, the external device compares the attestation against a list of known good values.

When a significant change occurs for one of the N computing devices of the cluster, the computing device updates its log and attestation and send the updated log and attestation to the cluster security module. Which type of change constitutes a significant change varies from embodiment to embodiment. In response to receiving the updated log and attestation, the cluster security module utilizes the computing device's updated log to bring up to date the aggregate log for the cluster. The cluster security module also generates an updated attestation for the cluster in response to receiving the updated log and attestation.

Referring now to FIG. 1, a block diagram of one embodiment of a computer system 100 is shown. System 100 includes cluster 105 coupled to clients 120A-N via network 110. Cluster 105 includes machines 110A-N, which are representative of any number and type of physical or virtual machines. It is noted that machines 110A-N can also be referred to as computers, servers, or computing devices. In various embodiments, each of machines 110A-N correspond to any of various types of computer systems or computing devices, including, but not limited to, a personal computer system, desktop computer, laptop or notebook computer, supercomputer, tablet, phone, smartphone, mainframe computer system, handheld computer, workstation, network computer, a consumer device, load balancer, server, file server, application server, storage server, or in general any type of computing system or device.

In the following discussion, the term "machine" refers to physical and/or virtual entities. Similarly, the terms "device" or "module" refer to physical and/or virtual entities. In some embodiments, each machine 110A-N includes a local security module (not shown). In one embodiment, the local security module is a Trusted Platform Module (TPM). When a machine 110A-N boots up, the machine accumulates a series of measurements that are recorded into the registers (e.g., platform configuration registers (PCRs)) of the TPM. PCRs are initialized on power up and used to store software integrity values. Individual software components (e.g., bootloader, BIOS, operating system, device drivers, applications) are measured by the TPM during boot-up and hash values written to a given PCR while also extending the previous value of the given PCR. These measurements are accumulated and cryptographically signed by the local TPM to prove the measurements are valid. A log of the measurements is maintained in parallel. As the configuration changes for a given machine 110A-N, new information reflecting the change is added to the log, a new measurement is recorded in the TPM, and an updated attestation is generated.

Cluster 105 also includes security modules 130A-N, which are representative of any number and type of central security modules which represent the cluster 105 as a whole. In one embodiment, cluster 105 includes a single cluster security module 130. In other embodiments, cluster 105 has multiple cluster security modules 130A-N. In some cases, one of the security modules 130A-N is designated as the primary security module and if this primary security module fails, then one of the other security modules 130A-N takes over as the primary security module. In some cases, all of the multiple cluster security modules 130A-N collect logs and attestations for the cluster and generate an aggregate log and single attestation for the cluster as a whole. In these cases, a challenger (e.g., one of clients 120A-N) connects to any of the cluster security modules 130A-N to request the aggregate log and single attestation for the cluster 105. When the challenger receives the aggregate log and attestation, the challenger verifies the attestation by recomputing it from the log entries, and use this information to decide if cluster 105 is running valid hardware and software. In one embodiment, each security module 130A-N represents a separate machine. In another embodiment, each security module 130A-N is software which executes on one or more machines. Generally speaking, each security module 130A-N can be implemented using any suitable combination of hardware and/or software.

When a significant change occurs for one of the machines 110A-N, the machine updates its log and attestation and send the updated log and attestation to each cluster security module 130A-N. As used herein, the term "attestation" is defined as an encrypted or signed value generated by encrypting or signing a summary or digest of a measurement log such that a third party can verify that the encrypted or signed value was generated by a trusted party. In one embodiment, the measurement log is signed with an attestation identify key (AIK). Any suitable attestation protocol can be utilized, depending on the embodiment. In response to receiving the updated log and attestation, each cluster security module 130A-N utilizes the machine's new log to update the aggregate log for the cluster 105. The cluster security module 130 also generates an updated attestation for the N computing devices and the cluster security module. The term "significant" can have a range of meanings and the term "significant change" can be defined as any of various events (e.g., state altering events), which can vary from embodiment to embodiment. Depending on the embodiment, the criteria for determining what constitutes a significant change varies from machine to machine and from cluster to cluster. For example, in one embodiment, if a machine crashed, this could be considered a significant change. Also, preventive maintenance can be performed on a machine or a machine could become obsolete, with both of these events considered significant changes. When a machine crashes, the cluster security module 130 generates a new aggregate log for the cluster that does not include the measurements from the crashed machine. If a new machine joins the cluster, this could also be considered a significant change. In other embodiments, a significant change can include other types of events.

Network 110 is representative of any number and type of networks. For example, network 110 can utilize a variety of techniques including wireless connection, direct local area network (LAN) connections, wide area network (WAN) connections such as the Internet, a router, storage area network, Ethernet, and others. Network 110 further includes remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth can be used in network 110. Network 110 interfaces with a set of communications protocols used for the Internet such as the Transmission Control Protocol (TCP) and the Internet Protocol (IP), or TCP/IP.

Clients 120A-N are representative of any number and type of computing devices or systems which utilize cluster 105 for storing and accessing data, performing computations, executing software, and/or other tasks. For example, clients 120A-N can include stationary or mobile computers such as desktop personal computers (PCs), servers, server farms, workstations, laptops, handheld computers, servers, personal digital assistants (PDAs), smart phones, tablets, and so forth. Generally speaking, each of clients 120A-N include one or more processors comprising one or more processor cores. Each processor core includes circuitry for executing instructions according to an instruction set architecture. For example, the x86 instruction set architecture can be selected. Alternatively, the ARM®, Alpha®, PowerPC®, SPARC®, or any other instruction set architecture can be selected. The processor cores can access cache memory subsystems for data and computer program instructions. The cache subsystems can be coupled to a memory hierarchy comprising random access memory (RAM) and a storage device.

In one embodiment, when a given client 120 connects to cluster 105, the given client 120 issues a challenge to one of the security modules 130A-N of the cluster 105 for the attestation and aggregate log representing cluster 105 as a whole. If the given client 120 is able to validate the attestation, then the given client 120 establishes a secure connection with cluster 105 and then proceed to perform its desired transactions with cluster 105. In one embodiment, the security modules 130A-N and clients 120A-N uses public key encryption techniques to perform the challenge request.

Cluster 105 is representative of any type of computer cluster or collection of multiple machines that are connected and work together. For example, in one embodiment, cluster 105 represents a cloud computing provider with multiple servers. In another embodiment, cluster 105 represents a high performance computing (HPC) system with multiple virtual or physical compute nodes. In a further embodiment, cluster 105 represents a front-end/back-end system. In a still further embodiment, cluster 105 represents a multi-layer system with multiple virtual or physical computers. In a still further embodiment, cluster 105 represents a group of internet of things (IoT) devices that collect and exchange data. Accordingly, when the term "cluster" is used within this disclosure, it is intended for "cluster" to represent any of these types of systems as well as others.

Figure 2:
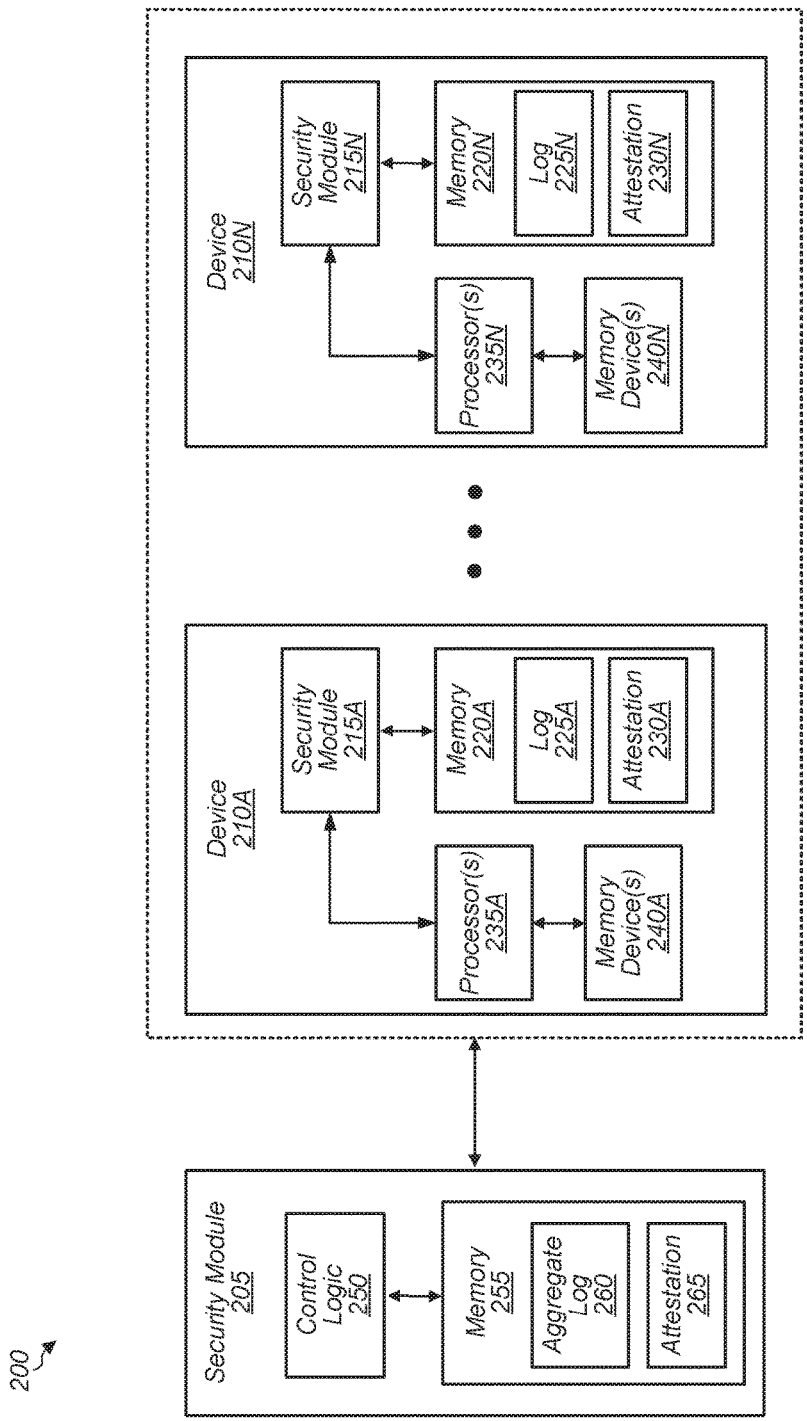
FIG. 2 is a block diagram of one embodiment of a cluster.

Turning now to FIG. 2, a block diagram of one embodiment of a cluster 200 is shown. Cluster 200 includes security module 205 and devices 210A-N. It should be understood that in other embodiments, cluster 200 includes other security modules in addition to security module 205. In these embodiments, the other security modules include the components shown as part of security module 205 and be configured to perform similar operations to those described for security module 205. Security module 205 includes control logic 250 coupled to memory 255, which is representative of any number and type of memory devices. Memory 255 can be any type of memory, including, but not limited to, random access memory (RAM), dynamic RAM (DRAM), hard disk drive, solid state drive, and others. Depending on the embodiment, control logic 250 includes any type of processing hardware and/or logic.

Devices 210A-N are representative of any number and type of machines, computing devices, or other types of computing systems. Devices 210A-N are connected together and connected to security module 205 using any of various interconnect and/or network technologies. Each device 210A-N includes corresponding memory 220A-N and corresponding processor(s) 235A-N, which are representative of any number and type of processors. Processor(s) 235A-N are connected to a communication infrastructure (not shown) which includes any type or combination of bus, fabric, and/or network. In one embodiment, processor(s) 235A-N execute the main control software (e.g., operating system) of each device 210A-N. Generally, software executed by processor(s) 235A-N during use control the other components of each device 210A-N to realize the desired functionality of the device. Processor(s) 235A-N also execute other software, such as application programs. The application programs provide user functionality, and rely on the operating system for lower level device control.

Each device 210A-N also includes a security module 215A-N, respectively. In one embodiment, each security module 215A-N is a trusted platform module (TPM). A TPM provides secure storage for cryptographic keys and control logic for performing various cryptographic operations, computing hashes, generating random numbers, calculating keys, etc. In other embodiments, security modules 215A-N are other types of modules. Each security module 215A-N is configured to take measurements of the hardware and/or software of its host device and generate an attestation for the device. Each security module 215A-N is configured to convey the attestation and log to security module 205. In embodiments with multiple cluster security modules, each security module 215A-N is configured to convey the attestation and log to all of the central security modules. Each device 210A-N also include other components not shown in FIG. 2 to avoid obscuring the figure. For example, each machine 210A-N includes a communication interface to allow the machine to communicate with external devices. Examples of communication interfaces include a modem, a network interface (such as an Ethernet card), a communications port, a universal serial bus (USB) port, etc.

Security module 205 is configured to receive the attestations and logs from devices 210A-N. Security module 205 also generates an attestation and log for its own hardware and/or software. Security module 205 aggregates the logs from devices 210A-N with its own log. Then, security module 205 creates an aggregate log 260 and attestation 265 for the entire cluster 200. In one embodiment, security module 205 is a centralized place that represents the cluster 200 as a whole. A challenger, instead of demanding attestation of a single machine, requests an attestation that represents the entire cluster 200. Security module 205 is configured to provide aggregate log 260 and the single attestation 265 to a challenger in response to receiving a challenge request. While each device 210A-N has its own operating system and system image, security module 205 represents cluster 200 as having a single system image when providing aggregate log 260 and the single attestation 265 to a challenger.

Figure 3:
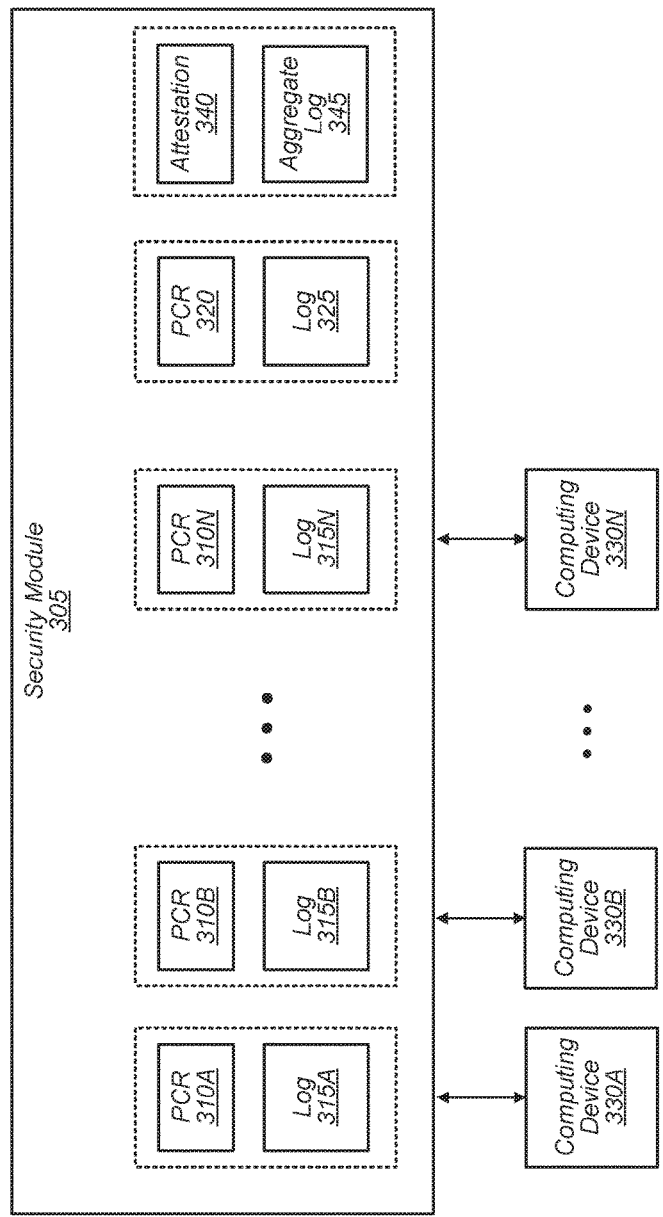
FIG. 3 is a block diagram of another embodiment of a cluster.

Referring now to FIG. 3, a block diagram of another embodiment of a cluster 300 is shown. Cluster 300 includes security module 305 and computing devices 330A-N. Cluster 300 also includes other security modules and other components which are not shown in FIG. 3 to avoid obscuring the figure. Computing devices 330A-N are representative of any number and type of computing devices that can be included in cluster 300. Computing devices 330A-N can be coupled together and coupled to security module 300 using any of various types of networks and/or bus connections.

In one embodiment, security module 305 includes one or more platform configuration registers (PCRs) and logs for each computing device 330A-N in cluster 300. For example, in this embodiment, security module 305 maintains PCR 310A and log 315A to store security data generated by computing device 330A, security module 305 maintains PCR 310B and log 315B to store security data generated by computing device 330B, security module 305 maintains PCR 310N and log 315N to store security data generated by computing device 330N, and so on. Security module 305 also includes PCR 320 and log 325 to store its own measurements. Security module 305 also generates attestation 340 from the PCRs 310A-N and logs 315A-N, with attestation 340 representing cluster 300 as a whole. Additionally, security module 305 generates aggregate log 345 which combines the logs 315A-N and log 325. Security module 305 provides attestation 340 and aggregate log 345 to an external device in response to receiving a challenge from the external device.

Each PCR 310A-N is representative of any number and type of registers which are used to store measurement data received from a corresponding computing device 330A-N. In another embodiment, rather than having a separate PCR and log for each computing device 330A-N, security module 305 includes a single PCR for storing and combining the security measurements from multiple computing devices 330A-N. In this embodiment, security module 305 also includes a single log file for combining all of the logs from the computing devices 330A-N.

Figure 4:
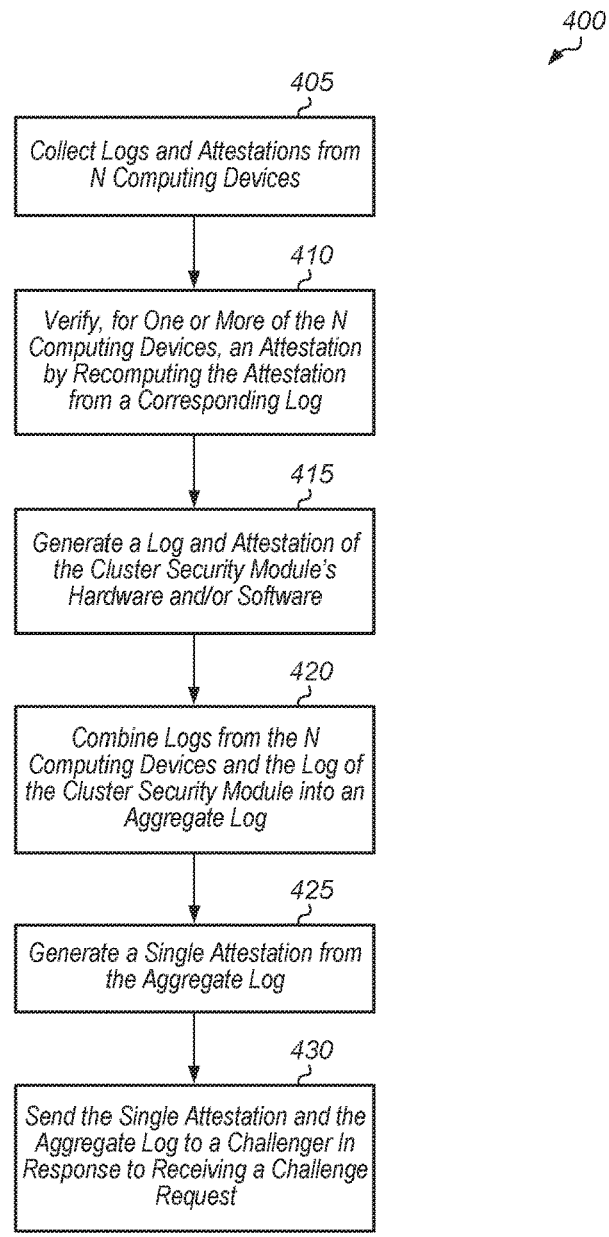
FIG. 4 is a generalized flow diagram illustrating one embodiment of a method for generating trusted attestations for a cluster of multiple computing devices.
Figure 5:
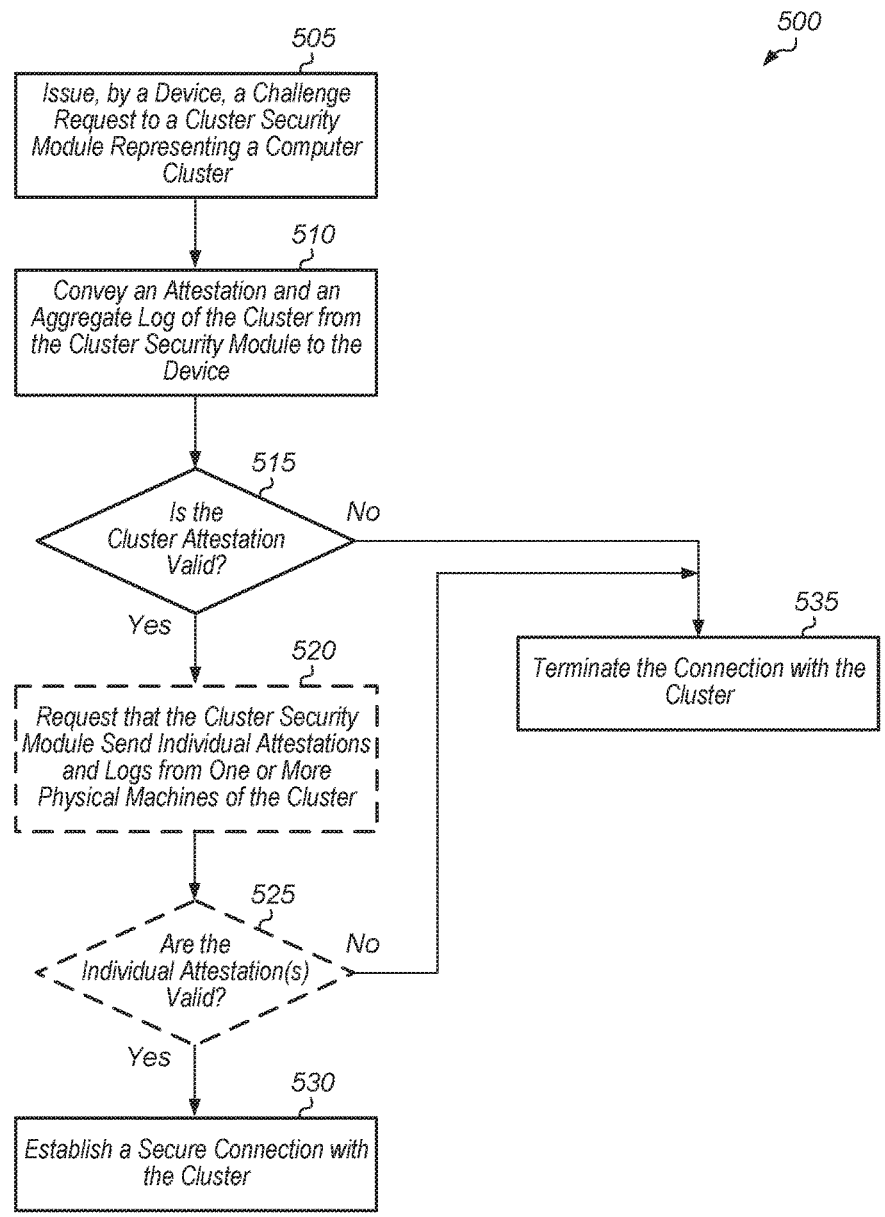
FIG. 5 is a generalized flow diagram illustrating one embodiment of a method for issuing a challenge request to a cluster.
Figure 6:
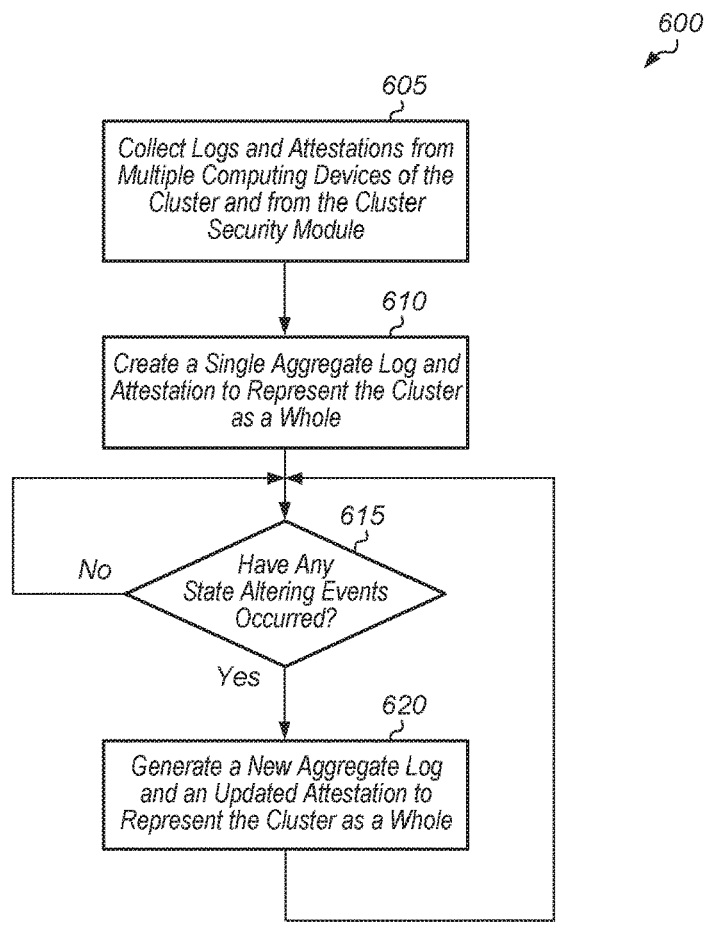
FIG. 6 is a generalized flow diagram illustrating one embodiment of a method for updating logs and attestations in response to changes occurring within a cluster.

Turning now to FIG. 4, one embodiment of a method 400 for generating trusted attestations for a cluster of multiple computing devices is shown. For purposes of discussion, the steps in this embodiment and those of FIGS. 5-6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 400.

A cluster security module collects logs and attestations from N computing devices (block 405). These logs and attestations can also be referred to as device logs and device attestations. It is assumed that N is a positive integer greater than one. In one embodiment, each of the N computing devices includes a local security module which is configured to maintain a log of measurements of hardware and/or software of the computing device and calculate an attestation from the log. In some embodiments, the system or cluster with the N computing devices includes multiple cluster security modules, with each cluster security module performing the actions described in method 400.

Next, the cluster security module verifies, for one or more of the N computing devices, an attestation by recomputing the attestation from a corresponding log (block 410). In one embodiment, the cluster security module verifies the attestations for all N computing devices by recomputing the individual attestations from the individual logs of all N computing devices. Also, the cluster security module generates a log and an attestation of the cluster security module's hardware and/or software (block 415). The log and attestation of the cluster security module can also be referred to as a security module log and a security module attestation.

Next, the cluster security module combines logs from the N computing devices and the log of the cluster security module into an aggregate log, with N+1 logs being combined into the aggregate log (block 420). The cluster security module also generates a single attestation from the aggregate log (block 425). The aggregate log and single attestation are intended to represent the cluster as a whole. The single attestation can also be referred to as a cluster attestation. The cluster security module sends the single attestation and the aggregate log to a challenger in response to receiving a challenge request (block 430). After block 430, method 400 ends.

Referring now to FIG. 5, one embodiment of a method 500 for issuing a challenge request to a cluster is shown. In the example shown, a device issues a challenge request to a cluster security module representing a computer cluster (block 505). Any of various challenge-response protocols can be utilized by the device and the cluster security module. The cluster includes multiple machines, with the machines including servers, computers, and/or other types of computing devices. In response to receiving the challenge request, the cluster security module conveys an attestation and an aggregate log of the cluster to the device (block 510). Then, the device determines if the cluster attestation is valid by examining the aggregate log (conditional block 515).

If the cluster attestation is invalid (conditional block 515, "no" leg), then the device terminates the connection with the cluster (block 535). If the cluster attestation is valid (conditional block 515, "yes" leg), then the device optionally requests that the cluster security module send individual attestations and logs from one or more machines of the cluster (block 520). In one embodiment, the challenger device randomly selects one or more machines to challenge as an additional verification step. In another embodiment, the challenger device challenges all of the machines of the cluster. Then, the device determines if the attestation(s) are valid by examining the individual log(s) of the machine(s) (conditional block 525). Alternatively, the challenger device skips these additional verification steps and instead establishes a secure connection with the cluster and begin to interact with the cluster (block 530).

If the attestations(s) from the selected machine(s) are valid (conditional block 525, "yes" leg), then the device establishes a secure connection with the cluster (block 530). If the attestations(s) from the selected machine(s) are invalid (conditional block 525, "no" leg), then the device terminates the connection with the cluster (block 535). After blocks 530 and 535, method 500 may end.

Turning now to FIG. 6, one embodiment of a method 600 for updating logs and attestations in response to changes occurring within a cluster is shown. In the example shown, a cluster security module collects logs and attestations from multiple computing devices of the cluster and from the cluster security module (block 605). Next, the cluster security module creates a single log and attestation to represent the cluster as a whole (block 610). Then, if a state altering event occurs for one of the computing devices (conditional block 615, "yes" leg), the cluster security module is configured to generate a new aggregate log and an updated attestation to represent the cluster as a whole (block 620). Which type of event constitutes a state altering event varies from embodiment to embodiment. For example, in one embodiment, a state altering event can be defined as the installation of a new software program on a given device, installing an update to the operating system of a given device, a device crashing, a new device being added to the cluster, and/or other events. In one embodiment, if a given computing device detects a state altering event, the given computing device is configured to generate a new log and new attestation and send these to the cluster security module. The cluster security module then incorporates the given computing device's new log into the aggregate log for the cluster and then generate an updated attestation for the cluster. If a computing device fails, then the cluster security module generates a new aggregate log for the cluster without the failed computing device's measurements and then the cluster security module generates an updated attestation for the cluster. After block 620, method 600 returns to conditional block 615. If no state altering events have occurred for the computing devices of the cluster (conditional block 615, "no" leg), then method 600 remains at conditional block 615.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a plurality of computing devices;
   at least one cluster security module; and
   a first cluster security module;
   wherein a first computing device of the plurality of computing devices comprises circuitry configured to execute the first cluster security module to:
   collect a device log and a device attestation from each of N computing devices of the plurality of computing devices other than the first computing device, wherein N is a positive integer greater than one;
   verify one or more of the collected device attestations, wherein verifying a given device attestation comprises recomputing the given attestation based on a collected device log that corresponds to the given device attestation;
   generate a security module log and a security module attestation for the first cluster security module;
   combine device logs from the N computing devices and the security module log of the first cluster security module to form an aggregate log;
   generate a cluster attestation from the aggregate log, wherein the cluster attestation represents the system as a whole;
   receive a challenge from a given computing device seeking to establish a connection with the cluster;
   convey the aggregate log and corresponding cluster attestation to the given computing device, in response to receiving the challenge; and
   establish a secure connection with the given computing device responsive to the given computing device determining the cluster attestation is valid.

2. The system as recited in claim 1, wherein N+1 logs are combined into the aggregate log.

3. The system as recited in claim 1, wherein the first cluster security module is configured to verify device attestations for all N computing devices by recomputing the device attestations from corresponding device logs.

4. The system as recited in claim 1, wherein responsive to receiving an indication of a state altering event occurring on one or more of the N computing devices, the first cluster security module is further configured to:
   update the aggregate log; and
   generate an updated cluster attestation for the N computing devices and the first cluster security module.

5. The system as recited in claim 1, wherein each computing device has its own local security module, wherein the first cluster security module is separate and distinct from each local security module of the N computing devices.

6. A method comprising:
   collecting, by a first computing device, a device log and a device attestation from each computing device of N computing devices other than the first computing device, wherein N is a positive integer greater than one;
   verifying, by the first computing device, one or more of the collected device attestations, wherein verifying a given device attestation comprises recomputing the given attestation based on a collected device log that corresponds to the given attestation;
   generating, by the first computing device, a security module log and a security module attestation for a cluster security module;
   combining device logs from the N computing devices and the security module log of the first cluster security module to form an aggregate log;
   generating a cluster attestation from the aggregate log, wherein the cluster attestation represents the system as a whole;
   receiving a challenge from a given computing device seeking to establish a connection with the cluster;
   conveying an aggregate log and corresponding cluster attestation to the given computing device, in response to receiving the challenge; and
   establishing a secure connection with the given computing device responsive to the given computing device determining the cluster attestation is valid.

7. The method as recited in claim 6, wherein N+1 logs are combined into the aggregate log.

8. The method as recited in claim 6, further comprising verifying device attestations for all N computing devices by recomputing the device attestations from corresponding device logs.

9. The method as recited in claim 6, wherein responsive to receiving an indication of a state altering event occurring on one or more of the N computing devices, the method further comprising:
   updating the aggregate log; and
   generating an updated cluster attestation for the N computing devices and the cluster security module.

10. The method as recited in claim 6, wherein each computing device of the N computing devices has its own local security module, wherein the cluster security module is separate and distinct from each local security module of the N computing devices.

11. A non-transitory computer readable storage medium storing program instructions, wherein the program instructions are executable by a processor to:
    collect a device log and a device attestation from each of N computing devices other than the first computing device, wherein N is a positive integer greater than one;
    verify one or more of the collected device attestations, wherein verifying a given device attestation comprises recomputing the given attestation based on a collected device log that corresponds to the given device attestation;
    generate a security module log and a security module attestation for the first cluster security module;
    combine device logs from the N computing devices and the security module log of the first cluster security module to form an aggregate log;
    generate a cluster attestation from the aggregate log, wherein the cluster attestation represents the system as a whole;
    receive a challenge from a given computing device seeking to establish a connection with the cluster;
    convey an aggregate log and corresponding cluster attestation to the given computing device, in response to receiving the challenge; and
    establish a secure connection with the given computing device responsive to the given computing device determining the cluster attestation is valid.

12. The non-transitory computer readable storage medium as recited in claim 11, wherein N+1 logs are combined into the aggregate log.

13. The non-transitory computer readable storage medium as recited in claim 11, wherein the program instructions are further executable by the processor to verify device attestations for all N computing devices by recomputing the device attestations from corresponding device logs.

14. The non-transitory computer readable storage medium as recited in claim 11, wherein responsive to receiving an indication of a state altering event occurring on one or more of the N computing devices, the program instructions are further executable by the processor to:
  update the aggregate log; and
  generate an updated attestation for the N computing devices and the cluster security module.

* * * * *